United States Patent [19]

Fleig et al.

[11] 4,049,622
[45] Sept. 20, 1977

[54] SELF-EXTINGUISHING THERMOPLASTIC MOLDING COMPOSITIONS

[75] Inventors: Helmut Fleig, Mannheim; Helmut Hagen, Frankenthal; Herbert Naarmann, Wattenheim; Klaus Penzien, Frankenthal, all of Germany

[73] Assignee: BASF Aktiengesellschaft, Ludwigshafen (Rhine), Germany

[21] Appl. No.: 715,640

[22] Filed: Aug. 18, 1976

[30] Foreign Application Priority Data

Oct. 9, 1975 Germany .............................. 2545223

[51] Int. Cl.$^2$ .......................... C08J 9/00; C08K 5/46
[52] U.S. Cl. .................. 260/2.5 HB; 260/2.5 FP; 260/45.8 SN; 260/302 D; 260/DIG. 24
[58] Field of Search ................ 260/45.8 SN, 302 D, 260/2.5 HB, 2.5 FP

[56] References Cited

U.S. PATENT DOCUMENTS

| 3,637,723 | 1/1972 | Meek | 260/302 D |
| 3,676,449 | 7/1972 | Song | 260/45.8 SN |

FOREIGN PATENT DOCUMENTS

1,016,520  1/1966  United Kingdom ............ 260/302 D

OTHER PUBLICATIONS

DAS 1249873-Badische Anilin & Soda Fabrik, Sept. 1967.
DAS 1299296-Kalle A/G, July, 1969.

*Primary Examiner*—H.S. Cockeram
*Attorney, Agent, or Firm*—Keil, Thompson & Shurtleff

[57] ABSTRACT

Thermoplastic molding compositions based on styrene polymers contain, as a flameproofing agent, an organic bromine compound of the general formula

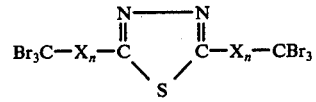

where X is a hydrocarbon radical and $n$ is 0 or 1. The compositions may be used for the manufacture of self-extinguishing moldings, e.g. foams.

7 Claims, No Drawings

SELF-EXTINGUISHING THERMOPLASTIC MOLDING COMPOSITIONS

The present invention relates to thermoplastic molding compositions based on styrene polymers, preferably formed styrene polymers, which have been flameproofed with an organic bromine compound.

The use of halogen-containing materials as flameproofing agents for self-extinguishing thermoplastic polymers has been disclosed. To achieve an adequate effect, relatively large amounts of halogen-containing materials must be added, but this has an adverse effect on the mechanical properties of the polymers.

It has been also disclosed that the flame-retardant action of organic bromine compounds is improved by adding organic peroxides. However, the latter have the disadvantage that they are toxic and may decompose explosively.

German Published Application DAS 1,255,302 discloses the use of polymers and oligomers of p-diisopropylbenzene as synergistic agents for bromine-containing flameproofing agents. A disadvantage of using these insoluble products is their state of aggregation, namely that they are solid, which makes it difficult to mix them homogeneously with the substrate to be protected. J. Eichhorn, J. Appl. Polym. Sci. 8 (1964), 2,504 claims that azodiisobutyronitrile and azodicyclohexanonitrile are also effective as synergistic agents. However, these compounds, and their decomposition products, are very toxic because of the possibility of elimination of hydrocyanic acid. Furthermore, the relatively low solubility of the powders makes if difficult to admix them to the thermoplastic, and distribute them homogeneously therein.

It is an object of the present invention to provide materials which are more effective than the conventional bromine-containing flameproofing agents and which do not suffer from the stated disadvantages.

We have found that this object is achieved by thermoplastic molding compositions based on styrene polymers, which contain an organic bromine compound of the general formula

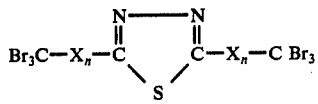

where X is a divalent aliphatic, aromatic, cycloaliphatic or araliphatic radical of up to 12 carbon atoms and $n$ is 0 or 1.

Examples of suitable compounds of the above formula are

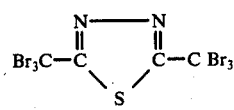

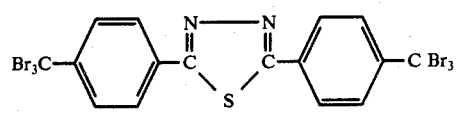

These new bromine compounds can be manufactured, for example, by reacting hydrazine with aldehydes (e.g. acetaldehyde) and sulfur, and then carrying out a bromination.

It is advantageous if the bromine derivatives can be introduced into the polymer to be flameproofed as a solution. The compounds should have a very low volatility and should be very difficult to decompose, i.e. their melting point should preferably be above 200° C.

Styrene polymers which may be used are polystyrene and copolymers of styrene with up to 50% by weight of comonomers. Examples of the latter are α-methylstyrene, acrylonitrile and esters of acrylic acid or methacrylic acid with alcohols of 1 to 8 carbon atoms. It is also possible to use styrene polymers which have been modified to increase their impact strength, and which have been manufactured by polymerizing styrene, with or without acrylonitrile, in the presence of rubbery polymers of butadiene, isoprene, ethylene/propylene or acrylic esters, e.g. high-impact polystyrene containing from 2 to 10% by weight of polybutadiene, ABS polymers containing from 5 to 30% by weight of polybutadiene or ASA polymers containing from 10 to 40% by weight of polyacrylate.

Molding compositions which can be used for the manufacture of self-extinguishing foam moldings are particularly important. These preferably contain, as the blowing agent, liquid or gaseous organic compounds which do not dissolve the polymer and which have a boiling point below the softening point of the polymer, e.g. aliphatic or cycloaliphatic hydrocarbons, such as propane, butane, pentane, hexane, heptane, cyclohexane or halohydrocarbons, e.g. methyl chloride, dichlorodifluoromethane or 1,2,2-trifluoro-1,1,2-trichloroethane. It is advantageous to use from 3 to 10% by weight of blowing agent, based on the styrene polymer. For further details, reference may be made to Kunststoffhandbuch, volume V, "Polystyrol", Carl-Hanser-Verlag, chapter 6 "Polystyrol-Schaumstoffe".

Preferred organic bromine compounds to use are those of the above thiadiazoles which contain more than 40% by weight of bromine. These compounds are particularly suitable since they are of low volatility, have only a slight plasticizing action, if any, and do not have an objectionable odor. The bromine compounds are suitably used in such amounts that the molding compositions contain not less than 0.1%, and not more than 5%, of bromine. Preferably, they contain from 0.5 to 3% by weight of bromine.

The presence of other, conventional flameproofing agents or synergistic agents in the molding compositions is not excluded.

The molding compositions may also contain further components, e.g. fillers, colored pigments, lubricants, plasticizers, anti-static agents, antioxidants, stabilizers or compounds which assist foaming.

The organic bromine compounds may, for example, be incorporated into the plastic on a mill, in an extruder or in a kneader. It is also possible to coat the surface of finely particulate styrene polymers with the bromine compounds. In many cases, the compounds can also be added to the monomers even before the polymerization. It is also possible, for example when manufacturing cast films, to add the bromine compound to a solution of the plastic and to evaporate off the solvent.

The molding compositions can be in a particulate form, e.g. in the form of beads, in the form of granules or in the form of coarse material, such as is obtained on milling polymers obtained by mass polymerization. The diameter of the particles is advantageously from 0.1 to 6 mm, preferably from 0.4 to 3 mm.

The molding compositions may be processed, for example, by injection molding, extrusion or sintering in molds, to give self-extinguishing moldings or profiles. Because of their relatively low content of organic halogen compounds, the softening points of the molding compositions according to the invention only differ slightly from those of the polymers on which they are based.

It is advantageous that the use of these bromine compounds suffices without adding the synergistic azo compounds or peroxides. Furthermore, it is found that the self-extinguishing character of the compositions is not lost even on prolonged storage at elevated temperatures.

The self-extinguishing moldings manufactured from the molding compositions are tested as follows:

The test is carried out with moldings of size 0.1 × 10 × 30 cm in the case of unfoamed compositions and with moldings of size 0.5 × 15 × 40 cm in the case of foamed compositions; the moldings are held for 5 seconds in a gas flame of 40 mm height, and the flame is then removed with a gentle movement. The time the molding takes to self-extinguish after it has been removed from the flame is a measure of its non-flammability. Molding compositions which have been rendered insufficiently nonflammable, if at all, burn away completely after removal from the flame. Particular advantages in using these bromine compounds, in accordance with the invention, are, firstly, their high effectiveness without synergistic additives such as azo derivatives or peroxides, and secondly, the substantially more advantageous extinction times achieved for a comparable bromine content. Furthermore, the dripping of flaming particles is substantially reduced by the use of the bromine derivatives of the invention.

In the Examples, parts and percentages are by weight.

EXAMPLES 1 to 15

In each case, 30 parts of a styrene polymer and 0.3 part of an organic bromine compound are dissolved in 100 parts of methylene chloride. 3 parts of pentane are added to the solution. The solution is then cast on a glass plate and the methylene chloride is allowed to evaporate at room temperature. At the same time the pentane remains homogeneously distributed in the mixture. The film thus obtained is foamed in steam at 100° C and is dired under reduced pressure at 35° C for 12 hours. The film sheets obtained are tested for their non-flammability by the method described above. The results are shown in the table. Azodiisobutyronitrile (y) or dicumyl peroxide (a) were employed as synergistic agents. HBCD is hexabromocyclododecane, a conventional flameproofing agent.

| Example | Bromine compound Type | Amount | Synergistic agent Type | % | Extinction time seconds |
|---|---|---|---|---|---|
| 1 | HBCD | | — | — | 12.0 |
| 2 | " | 1% | a | 0.05 | 3.5 |
| 3 | " | 1% | a | 0.1 | 3.0 |
| 4 | " | 1% | a | 0.5 | 2.0 |
| 5 | " | 1% | y | 0.05 | 4.9 |
| 6 | " | 1% | y | 0.1 | 4.5 |
| 7 | " | 1% | y | 0.5 | 2.0 |
| 8 | I | 1% | | | 0 |
| 9 | I | 0.8% | | | 0 |
| 10 | I | 0.6% | | | 0 |
| 11 | I | 0.4% | | | 0 |
| 12 | II | 1% | | | 0 |
| 13 | II | 0.8% | | | 0 |
| 14 | II | 0.6% | | | 0 |

-continued

| Example | Bromine compound Type | Amount | Synergistic agent Type | % | Extinction time seconds |
|---|---|---|---|---|---|
| 15 | II | 0.4% | | | 1.0 |
| 16 | I | 1% | a | 0.05% | 0 |
| 17 | I | 1% | HBCD | 0.2 | 0 |

When using I or II, only slight dripping of flaming particles was observed, whilst in Comparative Experiments 1 – 7 and 16 very severe dripping was observed.

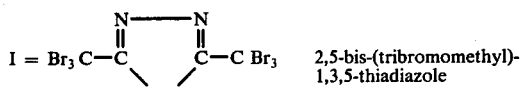

I = 2,5-bis-(tribromomethyl)-1,3,5-thiadiazole

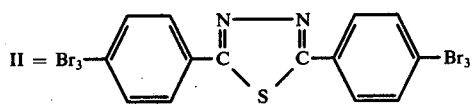

Examples 8 to 17 are in accordance with the invention.

EXAMPLE 18

Example 8 was repeated, using a copolymer of 75% of styrene and 25% of acrylonitrile. The extinction time was 0 seconds whilst when using 1% of HBCD and 0.3% of synergistic agent a it was 3.5 seconds.

EXAMPLE 19

A mixture of 100 parts of a styrene polymer which has been manufactured by polymerizing 95 parts of styrene in the presence of 5 parts of polybutadiene, and 1.5 parts of bis-tribromomethylthiazole (i) is extruded in an extruder, using a sheet die, to give a 1 mm thick sheet. The latter is tested for its non-flammability. If self-extinguishes 1.0 second after removing the flame. If, by way of comparison, a sheet which contains 1.5 parts of HBCD and 0.5 part of synergistic agent a is tested, it self-extinguishes after 8 seconds.

EXAMPLE 20

A nozzle for injecting fluids is provided on a twin-screw extruder, about one-third of the distance along the barrel, from the feed end. A mixture of 100 parts of polystyrene, 1.5 parts of bis-tribromomethylthiadiazole (I) and 1 part of kaolin is introduced into the hopper. The temperature in the melting zone is 180° C. In the subsequent mixing zone, sufficient methyl chloride is injected, through the nozzle, that the mixture leaving the die head contains about 10% of methyl chloride, based on polystyrene. The temperature in the mixing zone is 160° C. In the cooling zone which follows, the mixture is cooled to the point that when it leaves the die it is at 110° C. The strand leaving the die foams up, and the foam obtained has a density of about 40 g/l. A test specimen is practically instantly self-extinguishing; in a comparative experiment with HBCD, the flame only self-extinguished after 6.5 seconds.

EXAMPLE 21

0.64 part of polyvinylpyrrolidone of K value 90, to serve as a protective colloid, and 0.4 part of sodium pyrophosphate are dissolved in 400 parts of water, in a stirred vessel. 200 parts of styrene, in which 14 parts of pentane, 0.75 part of benzoyl peroxide and 3 parts of bis-tribromomethylthiadiazole (I) have been dissolved beforehand, are added. The mixture is heated at 70° C for 20 hours and is then kept at 85° C for a further 15 hours. The resulting polystyrene, containing blowing agent, is separated off, washed and dried. The prefoamed particles obtained after exposure to steam are kept for one day and then welded by further treatment with steam, in molds, to give foam polystyrene blocks. 1.5 cm thick foam sheets are cut from this block by means of an electrically heated wire. The sheets are stored for several days at room temperature and then trimmed to about 30 × 40 cm. Thereafter, these sheets are held, by their edge, in a luminous gas flame, the latter is removed and the time required for the foam polystyrene to self-extinguish is measured. The mean of 10 measurements is 0 seconds, i.e. extinction is instantaneous, or the samples virtually do not ignite. If the same procedure is followed except that HBCD is added the extinction of the flame on average only occurs after 5.4 seconds.

We claim:

1. A thermoplastic molding composition comprising a styrene homopolymer or a styrene copolymer containing a flameproofing amount of an organic bromine compound of the general formula

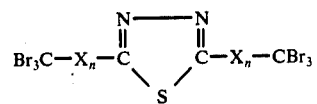

where X is a divalent aliphatic aromatic, cycloaliphatic or araliphatic radical of up to 12 carbon atoms and $n$ is 0 or 1.

2. A molding composition as claimed in claim 1, which contains such amounts of the bromine compound that the bromine content of the molding composition is from 0.1 to 5% by weight, based on the total weight of the molding composition.

3. A molding composition as claimed in claim 1, wherein the bromine compound is 2,5-(tribromomethyl)-1,3,5-thiadiazole.

4. A molding composition as claimed in claim 1, wherein the styrene copolymer contains at least 50% by weight of styrene as polymerized units.

5. A molding composition as claimed in claim 1, which contains from 3 to 10% by weight, based on the styrene homopolymer or copolymer, of a liquid or gaseous organic blowing agent.

6. A molding composition as claimed in claim 1, wherein the blowing agent is an aliphatic or aromatic hydrocarbon or a halohydrocarbon.

7. A molding composition as claimed in claim 1, which is in the form of particles of diameter from 0.1 to 6 mm.

* * * * *